United States Patent [19]

Jacob

[11] 4,027,953
[45] June 7, 1977

[54] SWITCH CONTROLLED ADJUSTABLE REAR VIEW MIRROR WITH BIMETAL MEANS

[75] Inventor: Keith D. Jacob, Ann Arbor, Mich.

[73] Assignee: Donald F. Hassinger, Ann Arbor, Mich.

[22] Filed: Mar. 10, 1976

[21] Appl. No.: 665,688

[52] U.S. Cl. .............................. 350/288; 350/289
[51] Int. Cl.² ........................................ G02B 5/08
[58] Field of Search .......... 350/289, 288, 304, 285, 350/6

[56] References Cited
UNITED STATES PATENTS

| | | | |
|---|---|---|---|
| 2,920,529 | 1/1960 | Blythe | 350/289 |
| 3,873,190 | 3/1975 | Hess | 350/289 |

Primary Examiner—John K. Corbin
Assistant Examiner—Jon W. Henry
Attorney, Agent, or Firm—Olsen and Stephenson

[57] ABSTRACT

An adjustable rear view mirror movably mounted on a motor vehicle for adjustable movement between a normal centered position and positions angled to the left and right of the centered position to enlarge the areas of vision to the left rear and right rear of the vehicle operator, respectively. Bimetal elements which support the mirror in a housing are connected to the vehicular electrical system and in response to actuation of a switch a selected bimetal element becomes heated and moves the mirror between the centered and angled positions.

9 Claims, 3 Drawing Figures

SWITCH CONTROLLED ADJUSTABLE REAR VIEW MIRROR WITH BIMETAL MEANS

BACKGROUND OF THE INVENTION

The present invention relates generally to vehicular rear view mirrors, and more specifically, to adjustable rear view mirrors wherein selective actuation of a switch causes the rear view mirror to angle from its centered position to positions angled either to the left or right side of the centered position to enlarge the area of vision to the left rear and right rear of the vehicle operator.

Reference is made to U.S. Pat. No. 3,199,075, issued Aug. 3, 1965, which discloses an adjustable rear view mirror for motor vehicles which can be angled to the left and right side of a centered position to eliminate the blind areas to the left side rear and the right side rear of the motor vehicle. These mirrors have generally been angled by electrically driven motors or solenoids. Mirrors driven by such components inherently do not have a long service life.

It is an object of this invention to provide an adjustable rear view mirror that is angled by bimetal elements.

SUMMARY OF THE INVENTION

The rear view mirror assembly of the present invention mounts on either the windshield or the windshield frame and is adjustable within its housing for movement from a normal centered position to positions angled on the left or right side of the centered position. This eliminates major blind areas which exist on the right side rear and left side rear of the motor vehicle and is particularly useful when the operator of the vehicle desires to change lanes as he is driving down the road.

The rear view mirror assembly consists of a mirror support housing which is universally mounted to the windshield and which is adjustable to the proper position so that the operator can see directly to the rear of the vehicle. A mirror is movably supported in the housing for movement from a normal centered position to positions angled to the left- and right-hand side of the centered position. A pair of bimetal elements, each being secured at one end to the housing and being pivotally connected at the other end to the mirror provides means for supporting and angling the mirror between its centered and angled positions. Selective actuation of a switch connects the appropriate bimetal element to the electrical system of the vehicle which causes the element to become heated and, because each component of the bimetal element has a different coefficient of expansion, the bimetal element expands and bends to angle the mirror to one of the angled positions.

One bimetal element angles the mirror in one direction and the other bimetal element angles the mirror in the opposite direction. Both bimetal elements are initially flexed to maintain the mirror in its normal centered position in the housing. When the switch is actuated and the related bimetal element is connected to the electrical system of the vehicle, it will become heated. When it reaches a predetermined temperature, the bimetal element will begin to expand and bend away from the housing and, under continued heating, it will bend through a distance which is proportional to the level of temperature that it has attained. Movement of the mirror is terminated by one of a pair of adjustable stops which are each mounted at opposite ends of the housing. After the switch is opened, the bimetal element will cool and straighten to its original position to thus return the mirror to its normally centered position.

Further objects, features and advantages of the present invention will become apparent from a consideration of the following description when taken in connection with the appended claims and the accompanying drawing in which:

Figure 1:
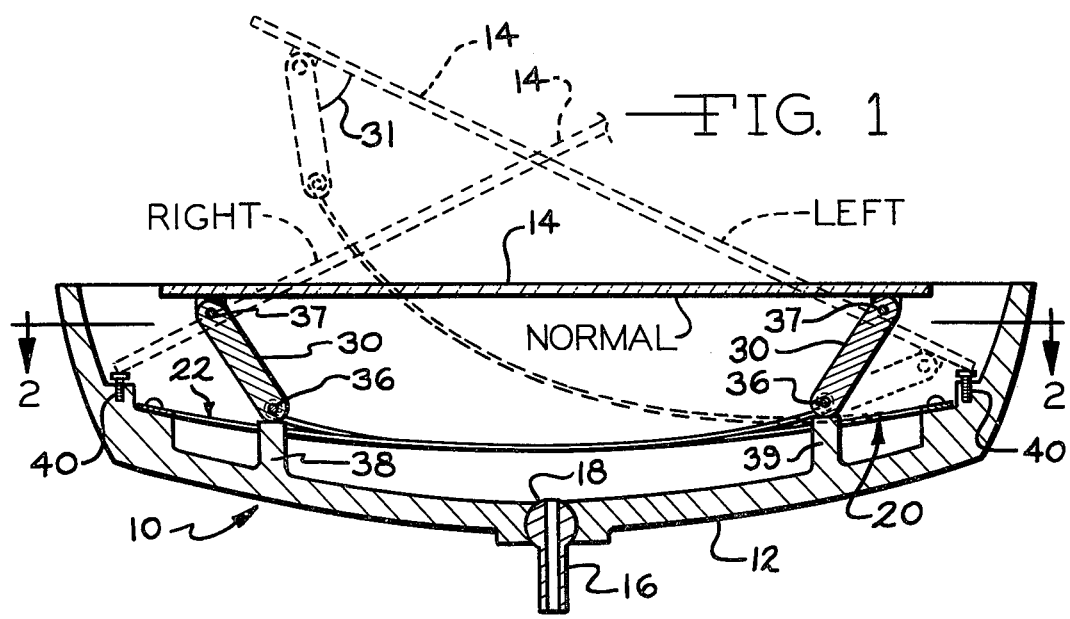
FIG. 1 is a sectional top view of the rear view mirror assembly of the present invention.
Figure 2:
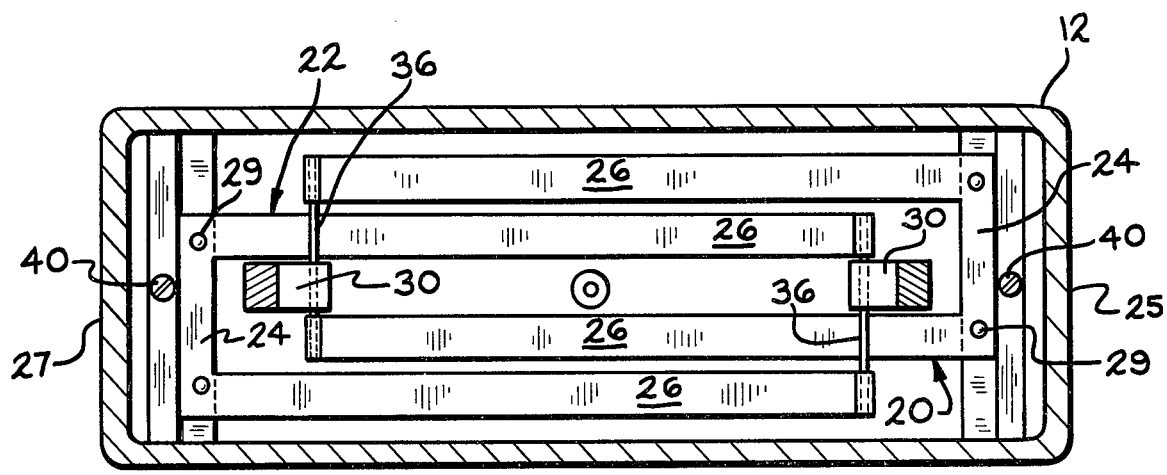
FIG. 2 is a sectional front view of the rear view mirror assembly taken substantially from line 2—2 in FIG. 1.

Referring to the drawing, the adjustable rear view mirror assembly of the present invention, shown generally at 10, consists of a housing 12 and a mirror 14 mounted on a motor vehicle (not shown). The housing 12 is connected to the windshield or windshield frame (not shown) by the stem 16 and the ball 18 and is universally movable so that the initial location of the mirror 14 relative to the vehicle operator can be established. The mirror 14 is movably mounted in the housing 12 for movement between a normal centered position and angled positions to the left and right side of the centered position to enlarge the areas of vision to the left side rear and right side rear of the motor vehicle, as shown in FIG. 1.

The mirror 14 is supported in the housing by a pair of bimetal elements 20 and 22 which also provide the means for angling the mirror 14 between its centered position and the angled positions. The bimetal elements 20 and 22 are each formed having a generally C-shaped configuration with an upright portion 24 and a pair of elongated transverse extensions 26. The bimetal elements 20 and 22 are respectively secured to the housing 12 by affixing each upright portion 24 to the ends 25 and 27 of the housing 12 by the rivets 29. The elements 20 and 22 are interleaved to provide for proper angling movement and to enable the manufacture of a compact mirror assembly.

The mirror 14 is secured to the bimetal elements 20 and 22 by a pair of connecting links 30. Each connecting link 30 is pivotally secured at one end to a hinge pin 36 which is attached to the ends of the extensions 26 of the bimetal elements 20 and 22 and the other end of each link 30 is pivotally secured to the mirror 14 by the pin 37. The included angle 31 between each connecting link 30 and the mirror 14 is acute so that the connecting link 30 is in the proper position to transfer forces from the bimetal elements 20 and 22 to the mirror 14 as the elements 20 and 22 expand and flex. This arrangement insures proper angling of the mirror 14 relative to the housing 12. When the mirror 14 is in its normal centered position, the bimetal elements 20 and 22 force the connecting links 30 against housing extensions 38 and 39 that are integrally formed with the housing 12. In addition to providing a support for the mirror 14, each extension 38 and 39 provides a fulcrum point about which the mirror 14 angles. That is, when the mirror 14 is angled to the left position (FIG. 1) by the bimetal element 20, the bimetal element 22 presses the connecting link 30 against the extension 39, which thus serves as the fulcrum point about which the mirror 14 angles and when the mirror 14 is angled to the right position by the element 22, the bimetal element 20 presses the other connecting link 30 against the extension 38, which thus serves as the other fulcrum point about which the mirror 14 angles.

Figure 3:
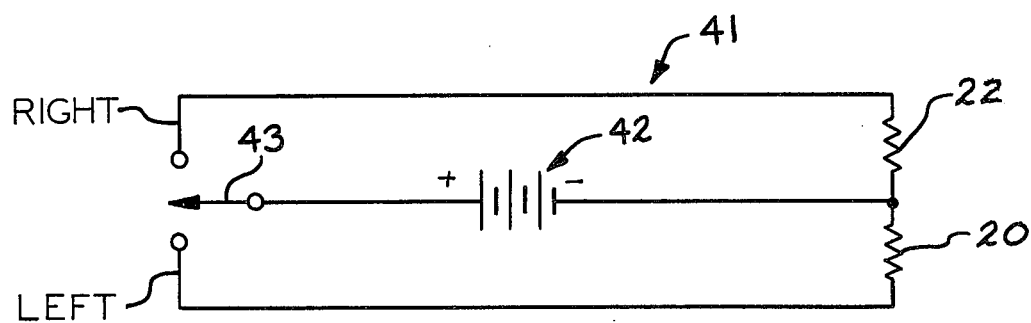
FIG. 3 is a schematic electrical diagram of the invention.

Movement of the mirror 14 is controlled by selectively connecting one of the bimetal elements 20 or 22 to the battery 42 shown as a component of the circuit 41 in FIG. 3. As previously mentioned, the bimetal elements 20 and 22 are initially bent a predetermined amount to secure the mirror 14 in its centered position in the housing 12. The bimetal elements 20 and 22 will remain in their original positions until their temperature reaches a predetermined level. When the temperature of one of the bimetal elements 20 or 22 reaches the predetermined level, it will then exert no force against the related housing extension 38 or 39. Continued heating of the bimetal element will cause it to expand and to bend away from the housing 12 (FIG. 1) a distance proportional to its temperature until it reaches the right or left angled position. This bending movement occurs because each metallic component of the bimetal element has a different coefficient of expansion. When the bimetal element is disconnected from the electrical system, it will begin to straighten to its original position, returning the mirror 14 to its centered position. In the present invention, a pair of adjustable stops 40 are threadably mounted, one at the end 25 and the other at the end 27, of the housing 12. This arrangement provides a positive mechanical stop for the mirror 14 when it reaches the left or right angled position and enables the vehicle operator to adjust the ultimate angled position of the mirror 14.

The circuitry 41 of the present invention functions to provide selective connection of the bimetal elements 20 and 22 to the vehicle's electrical system as shown in FIG. 3. A switch 43 operates to selectively connect and disconnect each bimetal element 20 and 22 with the battery 42. This arrangement prevents simultaneous connection of both bimetal elements 20 and 22 to the battery 42. The bimetal elements 20 and 22 each act as a resistor to the flowing current when connected to the battery 42 and as a result its temperature is increased causing it to expand and bend to thereby angle the mirror 14.

In operation, assume that the vehicle operator is driving on a highway in the right-most lane and that the housing 12 is properly adjusted and the mirror 14 is located in its normal centered position, as shown in FIG. 1. The operator decides to move to the adjacent left-hand lane. He would then actuate the switch 43 which would connect the bimetal element 20 to the battery 42 to angle the mirror to the left angled position (broken line, FIG. 1) where he could view the areas to the left side rear of the vehicle. If the driver wishes to view the areas to the right rear of the vehicle, the switch 43 will be activated to electrically connect the bimetal element 22 to the battery 42.

In the present invention, each bimetal element 20 and 22 will begin to bend at about 120° F and will reach its angled position when the temperature approximately reaches 170° F. When the switch is opened, each bimetal element will, as it cools, straighten; and the mirror 14 will return to its centered position.

It can thus be seen that an efficient, inexpensive rear view mirror is provided which enables the vehicle operator to increase his viewing areas to the left side rear and the right side rear of the vehicle. The rear view mirror assembly of this invention comprises a mirror movable between its centered position and angled positions by a pair of bimetal elements which become heated and flex when electrically connected to the vehicle's electrical system to thereby angle the mirror a selected angled position.

It is claimed:

1. An adjustable rear view mirror for use in a motor vehicle comprising a mirror, means movably mounting said mirror on said vehicle for movement between a normal centered position and positions angled to the left and right of said centered position to enlarge the areas of vision to the left rear and right rear of the vehicle operator, respectively, including bimetal means comprising metallic components having different coefficients of heat expansion, said bimetal means connected to said mirror, and means for heating and thereby expanding said components to cause bending of said bimetal means to move said mirror to said angled positions.

2. An adjustable rear view mirror according to claim 1 wherein said bimetal means comprises a pair of bimetal elements, one element being operable to move said mirror to one angled position and the other element being operable to move said mirror to the other angled position.

3. An adjustable rear view mirror according to claim 2 further including a housing, means for mounting said housing on said motor vehicle to enable universal movement to adjust the housing relative to the vehicle, said motor vehicle having an electrical system comprising said means for expanding said components, means supporting said mirror in said housing for angular movement from said centered position to said angled positions to the left and right of said centered position, one end of each bimetal element being affixed to said housing and the other end of each element being secured to said mirror, each of said elements being connected to said electrical system, and switch means provided for opening and closing the electrical connection between each element and said electrical system so that in response to operation of said switch means a selected bimetal element becomes heated and bends to thus angle the mirror from said normal centered position to one of said angled positions.

4. A rear view mirror according to claim 3 wherein said bimetal elements are flexed to a predetermined curvature to support the mirror in said normal centered position.

5. A rear view mirror according to claim 4 wherein each of said bimetal elements is pivotally secured to said mirror.

6. A rear view mirror according to claim 5 wherein a pair of extensions are integrally formed with said housing, said extensions providing pivot points about which said mirror angles, one extension providing a pivot point when said mirror is angled in one direction, the other extension providing a second pivot point when said mirror is angled in the other direction.

7. A rear view mirror according to claim 6 further inlcuding a pair of connecting links connecting said mirror with said bimetal elements, means pivotally securing each connecting link at one end thereof to said mirror and pivotally securing the other end thereof to one of said bimetal elements.

8. A rear view mirror according to claim 7 wherein said bimetal elements are disposed in a substantially horizontal plane, said one end of each element being affixed to said housing and said other end being pivotally secured to said connecting link.

* * * * *